(12) United States Patent
Chandran (10) Patent No.: US 9,335,876 B2
(45) Date of Patent: May 10, 2016

(54) CROSS-SHAPED TOUCHSCREEN PATTERN

(71) Applicant: STMicroelectronics Asia Pacific Pte Ltd, Singapore (SG)

(72) Inventor: Praveesh Chandran, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 108 days.

(21) Appl. No.: 14/218,079

(22) Filed: Mar. 18, 2014

(65) Prior Publication Data
US 2015/0268757 A1    Sep. 24, 2015

(51) Int. Cl.
*G06F 1/16* (2006.01)
*G06F 3/044* (2006.01)

(52) U.S. Cl.
CPC ...... *G06F 3/044* (2013.01); *G06F 1/16* (2013.01); *G06F 2203/04101* (2013.01); *G06F 2203/04111* (2013.01)

(58) Field of Classification Search
CPC . G06F 3/044; G06F 1/16; G06F 2203/04103; G06F 2203/04111; G06F 2203/04112; G06F 2203/04101
USPC ........................................ 345/174; 178/18.06
See application file for complete search history.

(56) References Cited

U.S. PATENT DOCUMENTS

| | | | | |
|---|---|---|---|---|
| 8,502,794 B2 * | 8/2013 | Chang | .................. | G06F 3/0418 345/173 |
| 8,872,786 B2 * | 10/2014 | Matsuo | .................. | G06F 3/044 345/174 |
| 2006/0066581 A1 * | 3/2006 | Lyon | .................. | G06F 3/044 345/173 |
| 2009/0273570 A1 * | 11/2009 | Degner | .................. | G06F 3/044 345/173 |
| 2010/0006347 A1 * | 1/2010 | Yang | .................. | G06F 3/044 178/18.01 |
| 2010/0117661 A1 * | 5/2010 | Bruwer | .................. | G06F 3/044 324/662 |
| 2010/0328249 A1 * | 12/2010 | Ningrat | .................. | G06F 3/046 345/174 |
| 2011/0102367 A1 * | 5/2011 | Wang | .................. | G06F 3/044 345/174 |
| 2011/0157079 A1 * | 6/2011 | Wu | .................. | G06F 3/044 345/174 |
| 2011/0221687 A1 * | 9/2011 | Liu | .................. | G02F 1/13338 345/173 |
| 2012/0044662 A1 * | 2/2012 | Kim | .................. | G06F 3/0418 361/816 |
| 2012/0092350 A1 * | 4/2012 | Ganapathi | .................. | G02B 26/0833 345/501 |
| 2012/0133611 A1 * | 5/2012 | Chai | .................. | G06F 3/044 345/174 |
| 2012/0139868 A1 * | 6/2012 | Mamba | .................. | G06F 3/044 345/174 |
| 2012/0229414 A1 * | 9/2012 | Ellis | .................. | G06F 3/044 345/174 |
| 2014/0035864 A1 * | 2/2014 | Chang | .................. | G06F 3/044 345/174 |
| 2014/0062912 A1 * | 3/2014 | Lien | .................. | G06F 3/0412 345/173 |
| 2014/0340354 A1 * | 11/2014 | Liu | .................. | G06F 3/044 345/174 |

* cited by examiner

*Primary Examiner* — Tom Sheng
(74) *Attorney, Agent, or Firm* — Gardere Wynne Sewell LLP

(57) ABSTRACT

A capacitive sensing structure comprises a plurality of first sensors electrically coupled to each other in a first direction, each first sensor comprising: a first arm extending along the first direction, and a second arm extending along a second direction perpendicular to the first direction and bisecting the first arm to form open regions at least partially defined by the first and second arm; a plurality of second sensors electrically coupled to each other in the second direction, each second sensor comprising: a first arm extending along the second direction, and a second arm extending along the first direction and bisecting the first arm to form open regions at least partially defined by the first and second arm; and a plurality of single electrically conductive and electrically floating structures, each disposed within open regions of adjacent first and second sensors.

23 Claims, 7 Drawing Sheets

CROSS-SHAPED TOUCHSCREEN PATTERN

FIELD OF THE INVENTION

The present disclosure generally relates to capacitive touchscreen panels and, more particularly, to a cross-shaped sensor pattern for use in a capacitive touchscreen.

BACKGROUND

Figure 1:
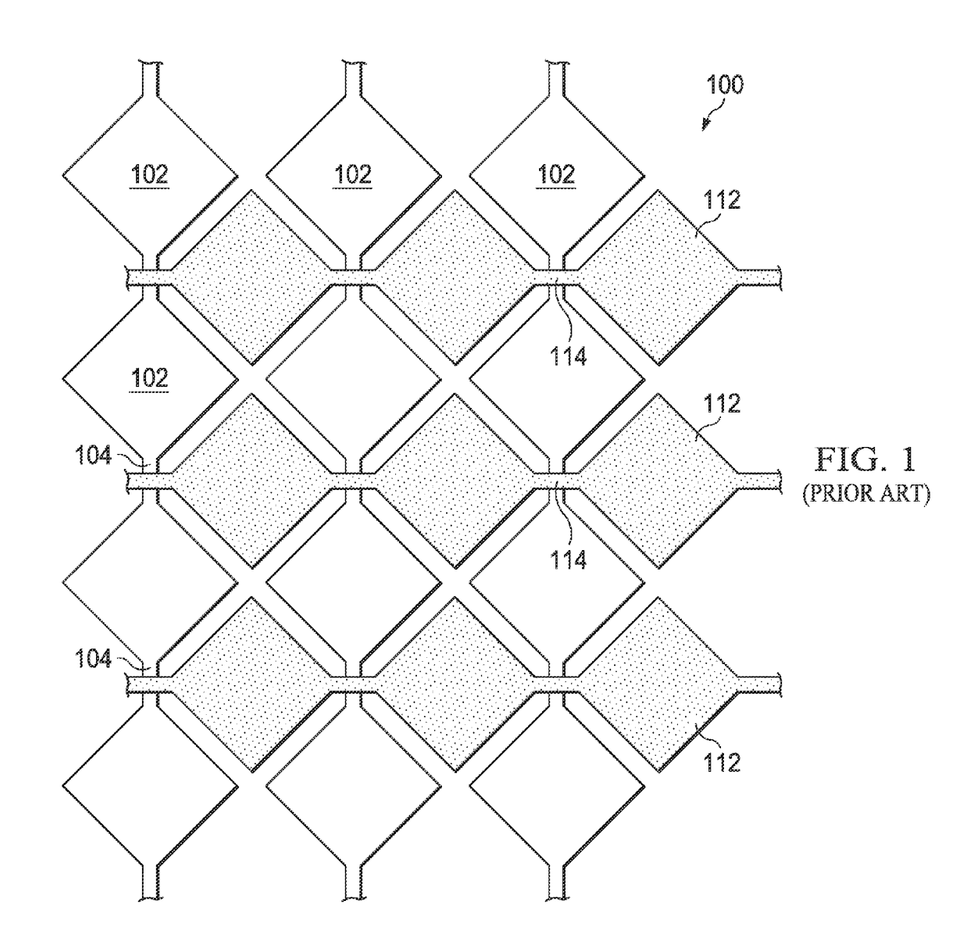
FIG. 1 illustrates a prior art diamond-shaped sensor pattern for use in a capacitive touchscreen.

Reference is now made to FIG. 1 which illustrates a prior art diamond-shaped sensor pattern 100 for use in a capacitive touchscreen. The sensor pattern 100 includes a first set of diamond-shaped sensors 102, often referred to in the art as the "Yforce" structure. The sensors 102 are arranged in a matrix such that sensors 102 in each column are connected to each other by a connecting member 104. The sensors 102 in adjacent columns are isolated from each other. The sensor pattern 100 also includes a second set of diamond-shaped sensors 112, often referred to in the art as the "Xsense" structure. The sensors 112 are arranged in a matrix such that sensors 112 in each row are connected to each other by a connecting member 114. The sensors 112 in adjacent rows are isolated from each other.

The matrix of the diamond-shaped sensors 102 is interleaved with the matrix of diamond-shaped sensors 112 in a manner where the space between a group of four diamond-shaped sensors 102 is occupied by one of the diamond-shaped sensors 112, and the space between a group of four diamond-shaped sensors 112 is occupied by one of the diamond-shaped sensors 102.

In some embodiments, the first and second sets of sensors 102 and 112 and connecting members 104 and 114 are made of a single patterned material layer, wherein connecting members 104 provide bridged connections to sensors 102 over the connecting members 114, or connecting members 114 provide bridged connections to sensors 112 over the connecting members 104. In other embodiments, the sensors 102 and connecting members 104 are made of a first patterned material layer, and the sensors 112 and connecting members 114 are made of a second patterned material layer. In the embodiments discussed herein, the material layers may comprise relevant materials known in the art such as, for example, indium tin oxide (ITO), and may be supported by a transparent substrate layer.

In embodiments wherein the sensor pattern comprises multiple material layers, the first and second patterned material layers are isolated from each other by an interposed insulating layer. The first patterned material layer including diamond-shaped sensors 102 and connecting members 104 may be the lower layer of the capacitive touchscreen, and the second patterned material layer including diamond-shaped sensors 112 and connecting members 114 may be the upper layer (as shown in FIG. 1), or vice versa. The insulating layer, first patterned material layer, and second patterned material layer are supported by a transparent substrate layer.

The prior art diamond-shaped sensor pattern described above typically overlays a display screen in a stacked configuration. Commonly, that display screen is a liquid crystal display (LCD) although other display technologies may also be used. In operation, these prior art diamond-shaped patterns can suffer from an unacceptable amount of noise captured from the underlying LCD display screen. Additionally, there is room for improvement with respect to sensitivity of the prior art diamond-shaped sensor patterns to capacitive touches (or proximity detections), particularly when an object having a small contact surface area, such as an active or passive stylus, is used to interface with the capacitive touchscreen.

A need accordingly exists in the art for an improved sensor pattern for capacitive touchscreen applications.

SUMMARY

The present disclosure provides a capacitive sensing structure, comprising: a plurality of first electrically conductive sensor structures electrically coupled to each other in a first direction; a plurality of second electrically conductive sensor structures electrically coupled to each other in a second direction; and a plurality of single electrically conductive structures, each disposed between a pair of adjacent first and second electrically conductive sensor structures, wherein each of the first electrically conductive sensor structures and second electrically conductive sensor structures comprise a cross-shaped region.

In another embodiment, the present disclosure provides a capacitive sensing structure, comprising: a plurality of first electrically conductive sensor structures electrically coupled to each other in a first direction, each first electrically conductive sensor structure comprising: a first arm extending along the first direction, and a second arm extending along a second direction perpendicular to the first direction and bisecting the first arm to form open regions at least partially defined by the first and second arm; a plurality of second electrically conductive sensor structures electrically coupled to each other in the second direction, each second electrically conductive sensor structure comprising: a first arm extending along the second direction, and a second arm extending along the first direction and bisecting the first arm to form open regions at least partially defined by the first and second arm; and a plurality of single electrically conductive structures, each disposed within open regions located between adjacent first and second electrically conductive sensor structures.

In yet another embodiment, the present disclosure provides a capacitive sensing structure, comprising: a plurality of transmit electrodes electrically coupled to each other in a first direction, each transmit electrode comprising: a first arm extending along the first direction, and a second arm extending along a second direction perpendicular to the first direction and bisecting the first arm to form open regions at least partially defined by the first and second arm; a plurality of receive electrodes electrically coupled to each other in the second direction, each receive electrode comprising: a first arm extending along the second direction, and a second arm extending along the first direction and bisecting the first arm to form open regions at least partially defined by the first and second arm; and a plurality of single electrically conductive structures, each disposed within open regions of adjacent transmit and receive electrodes.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which.

DETAILED DESCRIPTION OF THE EMBODIMENTS

Figure 2:
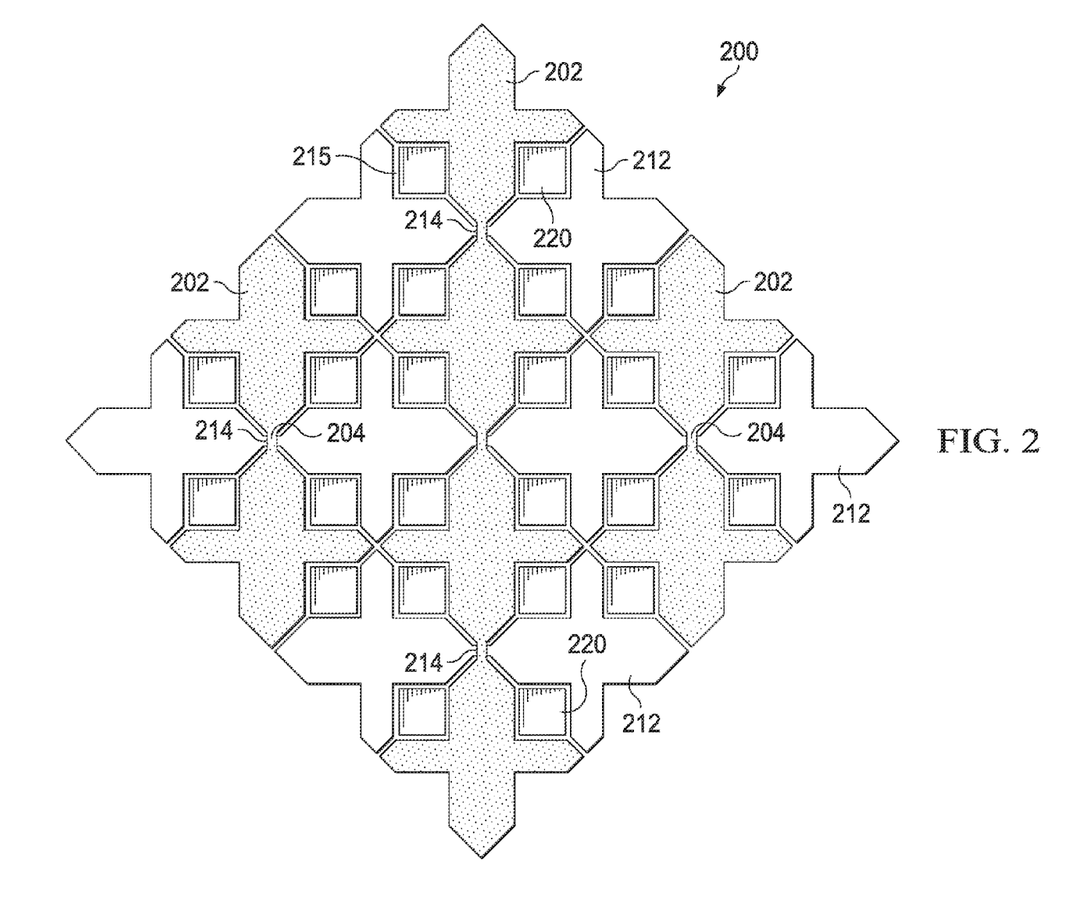
FIG. 2 illustrates an example embodiment of a cross-shaped sensor pattern for use in a capacitive touchscreen application.

Reference is now made to FIG. 2, which illustrates an example embodiment of a cross-shaped sensor pattern 200 for use in detecting a touch in a capacitive touchscreen application. The cross-shaped sensor pattern 200 includes a first set of cross-shaped sensors 202 arranged in a matrix such that sensors 202 in each column are connected to each other by a connecting member 204. The sensors 202 in adjacent columns are isolated from each other. The cross-shaped sensor pattern 200 also includes a second set of cross-shaped sensors 212 arranged in a matrix such that the sensors 212 in each row are connected to each other by a connecting member 214. The sensors 212 in adjacent rows are isolated from each other.

The matrix of the cross-shaped sensors 202 is interleaved with the matrix of cross-shaped sensors 212 in a manner where the space between a group of four cross-shaped sensors 202 is partially occupied by one of the cross-shaped sensors 212, and the space between a group of four cross-shaped sensors 212 is partially occupied by one of the cross-shaped sensors 202.

In some embodiments, the first and second sets of cross-shaped sensors 202 and 212 comprise a single patterned material layer, wherein connecting members 204 provide bridged connections to sensors 202 over the connecting members 214, or connecting members 214 provide bridged connections to sensors 212 over the connecting members 204. In other embodiments, the sensor pattern 200 may comprise multiple patterned material layers. For example, the cross-shaped sensors 202 and connecting members 204 may comprise a first patterned material layer, and the cross-shaped sensors 212 and connecting members 214 may comprise a second patterned material layer. In the embodiments discussed herein, the material layers may comprise relevant materials known in the art such as, for example, indium tin oxide (ITO), and may be supported by a transparent substrate layer.

In embodiments wherein the sensor pattern 200 comprises multiple patterned material layers, the first and second patterned material layers are isolated from each other by an interposed insulating layer. The first patterned material layer, including cross-shaped sensors 202 and connecting members 204, may be the upper layer of the capacitive touchscreen, and the second patterned material layer, including cross-shaped sensors 212 and connecting members 214, may comprise the lower layer (as shown in FIG. 2), or vice versa. The insulating layer, first patterned material layer, and second patterned material layer are supported by a transparent substrate layer.

Figure 3A:
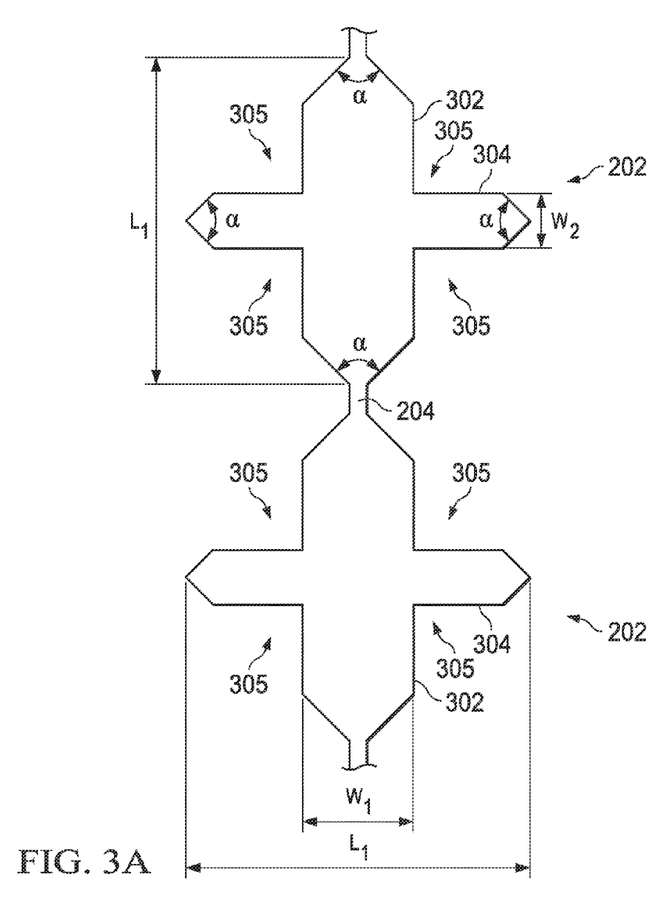
FIGS. 3A and 3B illustrate an example embodiment of cross-shaped sensors comprising the cross-shaped sensor pattern of FIG. 2.
Figure 3B:
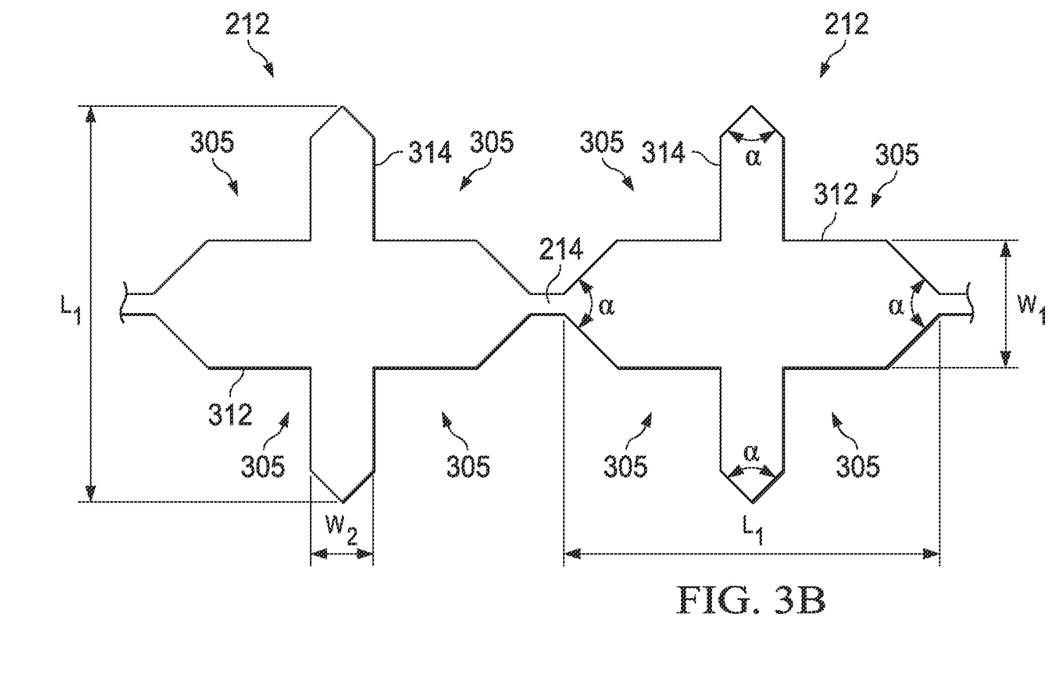

FIGS. 3A and 3B illustrate an example embodiment of cross-shaped sensors 202 and an example embodiment of cross-shaped sensors 212, respectively. In comparison to the diamond-shaped sensors shown in FIG. 1, the cross-shaped sensors 202 and 212 have a reduced surface area, which improves resolution for a given sensor pitch and increases the signal-to-noise ratio (SNR) of the sensors. The areas of the cross-shaped sensors 202 and 212 are reduced by shaping the sensors into crosses having orthogonal, bisecting "arms," thereby eliminating material of the sensors that would otherwise be present in a diamond-shaped pattern.

As shown in FIG. 3A, the cross-shaped sensors 202 each include a first arm 302 having a length $L_1$ and a width $W_1$ and a second arm 304 having length $L_1$ and a width $W_2$. In the embodiments illustrated herein, the width $W_1$ is greater than the width $W_2$. The first arm 302 extends along a first (vertical) direction and the second arm 304 extends perpendicular to the first arm 302 along a second (horizontal) direction such that the first and second arms 302 and 304 bisect each other and form open regions 305 at corners adjacent the bisecting arms 302 and 304 of the cross-shaped sensor 202. In one embodiment, the cross-shaped sensors 202 comprise the "Yforce," or transmit electrode, structure of the touchscreen panel and, therefore, form vertical columns of cross-shaped sensors 202 electrically connected at respective first arms 302 by connecting members 204 as shown in FIGS. 2 and 3A.

Similarly, the cross-shaped sensors 212, as shown in FIG. 3B, each include a first arm 312 having length $L_1$ and width $W_1$ and a second arm 314 having length $L_1$ and width $W_2$. The first arm 312 extends along the second (horizontal) direction and the second arm 314 extends perpendicular to the first arm 312 along the first (vertical) direction such that the first and second arms 312 and 314 bisect each other and form open regions 305 at corners adjacent the bisecting arms 312 and 314 of the cross-shaped sensor 212. In one embodiment, the cross-shaped sensors 212 comprise the "Xsense," or receive electrode, structure of the touchscreen panel and, therefore, form horizontal rows of cross-shaped sensors 212 electrically connected at respective first arms 312 by connecting members 214 as shown in FIGS. 2 and 3B.

As shown in FIGS. 3A and 3B, the first and second arms 302/312 and 304/314 of respective cross-shaped sensors 202 and 212 are orthogonal and, therefore, the corners defining the open regions 305 are formed at right angles. Furthermore, the open regions 305 are further defined by the bisected first and second arms 302/312 and 304/314 such that the open regions 305 are essentially defined as isosceles right triangles. Accordingly, the open regions 305 of adjacent cross-shaped sensors 202 and 212 form a square-shaped open region 215, as shown in FIG. 2. To accommodate such an arrangement of adjacent cross-shaped sensors 202 and 212 forming square-shaped open regions 215, the first and second arms 302/312 and 304/314 of the cross-shaped sensors 202/212 are tapered at the ends to form right angles (denoted in FIGS. 3A and 3B as angles α).

Referring again to FIG. 2, the sensor pattern 200 further includes a plurality of floating separators 220 disposed within the square-shaped open regions 215 located between the arms of adjacent cross-shaped sensors 202 and cross-shaped sensors 212. The floating separators 220 may be included in any of the patterned material layers. The floating separators 220 are conductive portions that are not electrically connected to each other, to cross-shaped sensors 202, to cross-shaped sensors 212, or to any other structure of the sensor pattern 200.

In some embodiments, the floating separators 220 are each comprised of the same material as the cross-shaped sensors 202 and 212 and as the connecting members 204 and 214. In a preferred embodiment, the cross-shaped sensors 202 and 212, connecting members 204 and 214, and floating separators 220 are comprised of ITO. Thus, the inclusion of floating separators 220 provide for a consistent visual effect to a user.

It should be appreciated, however, that the arrangement of floating separators 220 is merely exemplary of one way to arrange the plurality of floating separators 220 within the open regions 215. Furthermore, the use of square-shaped tiles for the plurality of floating separators 220 is exemplary. Other tile shapes, for example, round, triangular, hexagonal, rectangular, and the like, could instead be chosen. It should also be appreciated that, in some embodiments, the arms of the cross-shaped sensors may be designed such that the open regions 305 and 215 are defined as shapes other than isosceles right triangles and squares.

Figure 4:
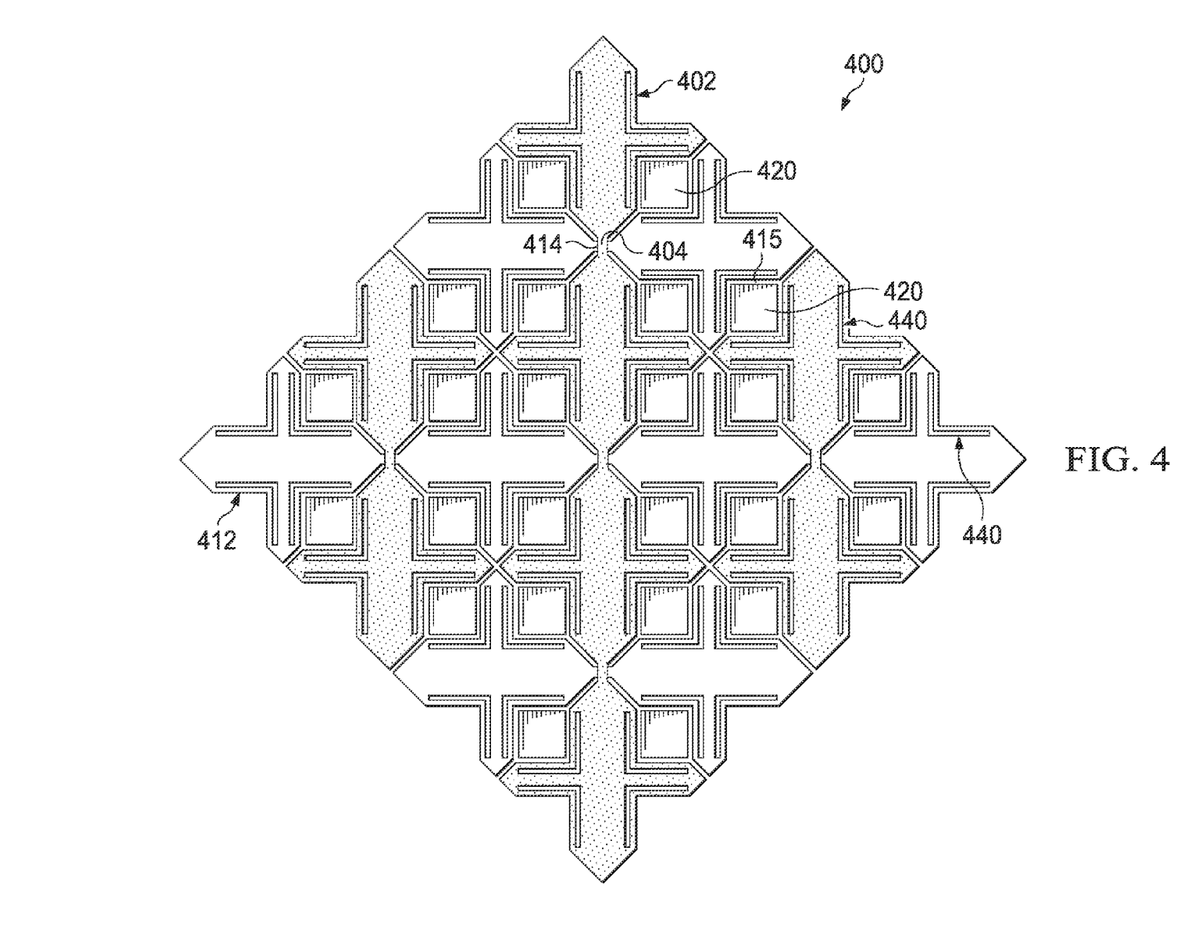
FIG. 4 illustrates another example embodiment of a cross-shaped sensor pattern for use in a capacitive touchscreen application.

Reference is now made to FIG. 4, which illustrates an alternate embodiment of a cross-shaped sensor pattern 400 for use in detecting a touch in a capacitive touchscreen application. The cross-shaped sensor pattern 400 includes a first set of cross-shaped sensors 402 arranged in a matrix such that sensors 402 in each column are connected to each other by a connecting member 404. The sensors 402 in adjacent columns are isolated from each other. The cross-shaped sensor pattern 400 also includes a second set of cross-shaped sensors 412 arranged in a matrix such that sensors 412 in each row are connected to each other by a connecting member 414. The sensors 412 in adjacent rows are isolated from each other.

The matrix of the cross-shaped sensors 402 is interleaved with the matrix of cross-shaped sensors 412 in a manner where the space between a group of four cross-shaped sensors 402 is partially occupied by one of the cross-shaped sensors 412, and the space between a group of four cross-shaped sensors 412 is partially occupied by one of the cross-shaped sensors 402.

In some embodiments, the first and second sets of cross-shaped sensors 402 and 412 comprise a single patterned material layer, wherein connecting members 404 provide bridged connections to sensors 402 over the connecting members 414, or connecting members 414 provide bridged connections to sensors 412 over the connecting members 404. In other embodiments, the sensor pattern 400 may comprise multiple patterned material layers. For example, the cross-shaped sensors 402 and connecting members 404 may comprise a first patterned material layer, and the cross-shaped sensors 412 and connecting members 414 may comprise a second patterned material layer. In the embodiments discussed herein, the material layers may comprise relevant materials known in the art such as, for example, indium tin oxide (ITO), and may be supported by a transparent substrate layer.

In embodiments wherein the sensor pattern 400 comprises multiple patterned material layers, the first and second patterned material layers are isolated from each other by an interposed insulating layer. The first patterned material layer, including cross-shaped sensors 402 and connecting members 404, may comprise the lower layer of the capacitive touchscreen, and the second patterned material layer, including cross-shaped sensors 412 and connecting members 414, may comprise the upper layer (as shown in FIG. 4), or vice versa. The insulating layer, first patterned material layer, and second patterned material layer are supported by a transparent substrate layer.

Figure 5A:
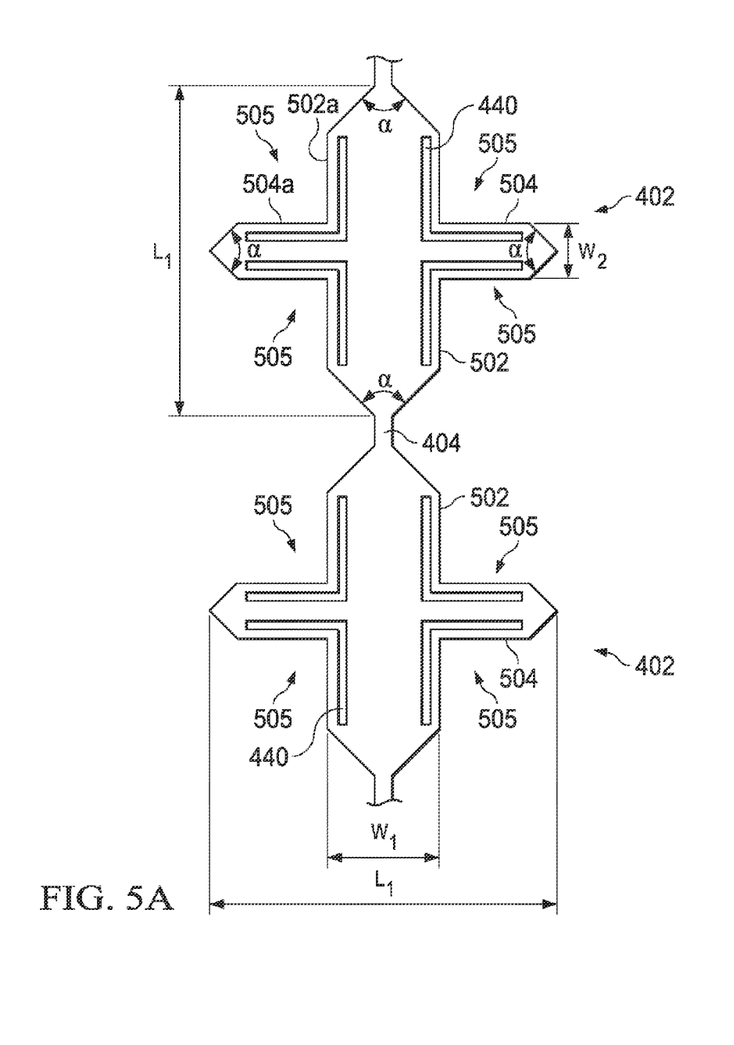
FIGS. 5A and 5B illustrate an example embodiment of cross-shaped sensors comprising the cross-shaped sensor pattern of FIG. 4.
Figure 5B:
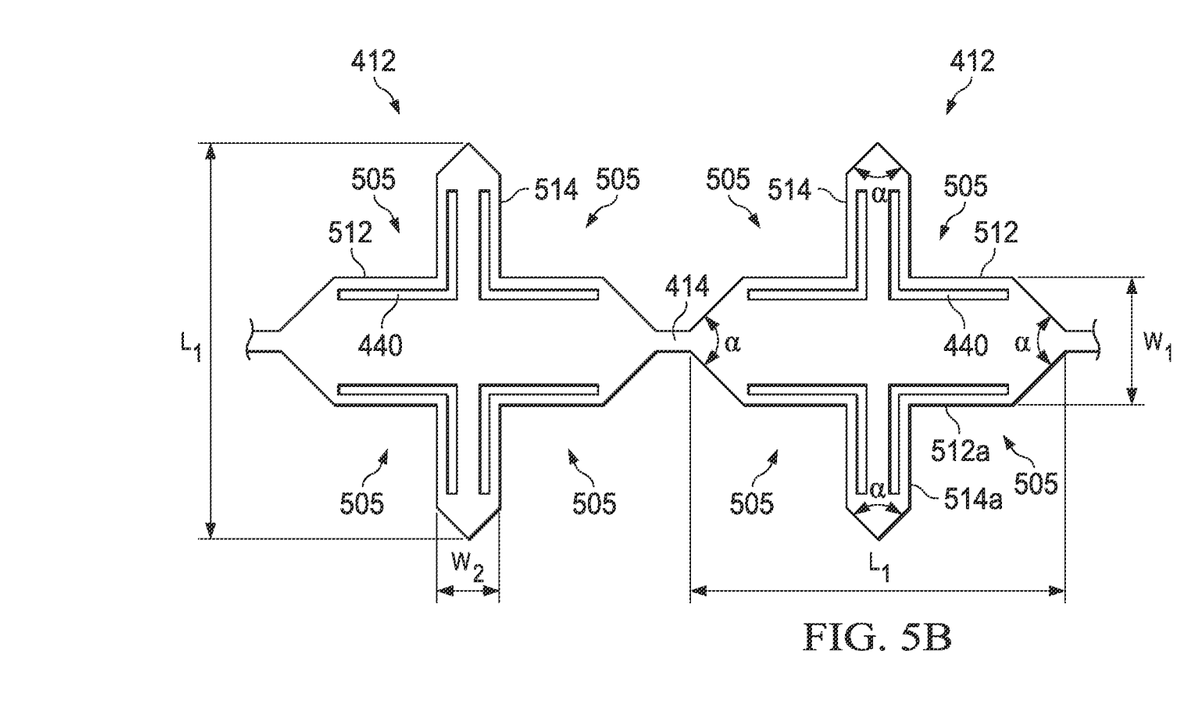

FIGS. 5A and 5B illustrate an example embodiment of cross-shaped sensors 402 and an example embodiment of cross-shaped sensors 412, respectively. The cross-shaped sensors 402 and 412 are similar in shape to respective cross-shaped sensors 202 and 212 except that the sensors 402 and 412 further include slotted openings 440 along the arms of the sensors. Thus, in comparison to the diamond-shaped sensors shown in FIG. 1, the cross-shaped sensors 402 and 412 also provide a reduced surface area, which improves resolution for a given sensor pitch and increases SNR of the sensors. In comparison to the cross-shaped sensors 202 and 212, the cross-shaped sensors 402 and 412 are further reduced in surface area by eliminating material to form the slotted openings 440. In addition, the slotted openings 440 cause discontinuities along the perimeter of the arms of the sensors 402 and 412, which improves generation of the fringing fields.

As shown in FIG. 5A, the cross-shaped sensors 402 each include a first arm 502 having a length $L_1$ and a width $W_1$ and a second arm 504 having length $L_1$ and a width $W_2$. In the embodiments illustrated herein, the width $W_1$ is greater than the width $W_2$. The first arm 502 extends along a first (vertical) direction and the second arm 504 extends perpendicular to the first arm 502 along a second (horizontal) direction such that the first and second arms 502 and 504 bisect each other and form open regions 505 at corners adjacent the bisecting arms 502 and 504 of the cross-shaped sensor 402. The cross-shaped sensors 402 also include a plurality of slotted openings 440 formed within the material comprising the cross-shaped sensors 402. In the embodiment illustrated in FIG. 5A, each slotted opening 440 is formed along a peripheral edge of the first arm 502 (see, for example, edge 502a) and an adjacent peripheral edge of the second arm 504 (see, for example, edge 504a) to create a discontinuity along the perimeter of the sensor 402. In one embodiment, the cross-shaped sensors 402 comprise the "Yforce," or transmit electrode, structure of the touchscreen panel and, therefore, form vertical columns of cross-shaped sensors 402 electrically connected at respective first arms 502 by connecting members 404 as shown in FIGS. 4 and 5A.

Similarly, the cross-shaped sensors 412, as shown in FIG. 5B, each include a first arm 512 having length $L_1$ and width $W_1$ and a second arm 514 having length $L_1$ and width $W_2$. The first arm 512 extends along the second (horizontal) direction and the second arm 514 extends perpendicular to the first arm 512 along the first (vertical) direction such that the first and second arms 512 and 514 bisect each other and form open regions 505 at corners adjacent the bisecting arms 512 and 514 of the cross-shaped sensor 412. The cross-shaped sensors 412 also include a plurality of slotted openings 440 formed within the material comprising the cross-shaped sensors 412. In the embodiment illustrated in FIG. 5B, each slotted opening 440 is formed along a peripheral edge of the first arm 512 (see, for example, edge 512a) and an adjacent peripheral edge of the second arm 514 (see, for example, edge 514a) to create a discontinuity along the perimeter of the sensor 412. In one embodiment, the cross-shaped sensors 412 comprise the "Xsense," or receive electrode, structure of the touchscreen panel and therefore form horizontal rows of cross-shaped sensors 412 electrically connected at respective first arms 512 by connecting members 414 as shown in FIGS. 4 and 5B.

It should be appreciated that the arrangement of slotted openings 440 as illustrated in FIGS. 4, 5A, and 5B is merely exemplary of one way to arrange the plurality of slotted openings 440 along the peripheral edges of the cross-shaped sensors 402 and 412. Furthermore, the use of a slotted shape for forming the openings is exemplary. The openings may be formed in other shapes or designs so as to create a discontinuity along the peripheral edge of the sensor. For example, the openings may be formed as a series of perforations, rounded openings, or openings of other shapes located along a peripheral edge of the sensor. Furthermore, the slotted openings formed along peripheral edges of adjacent arms do not need to be connected as shown in the figures. The slotted openings may be discrete openings extending only along the peripheral edge of a single arm of the sensor.

As shown in FIGS. 5A and 5B, the first and second arms 502/512 and 504/514 of respective cross-shaped sensors 402 and 412 are orthogonal and, therefore, the corners defining the open regions 505 are formed at right angles. Furthermore, the open regions 505 are further defined by the bisected first and second arms 502/512 and 504/514 such that the open regions 505 are essentially defined as isosceles right triangles. Accordingly, the open regions 505 of adjacent cross-shaped sensors 402 and 412 form a square-shaped open region 415, as shown in FIG. 4. To accommodate such an arrangement of adjacent cross-shaped sensors 402 and 412 forming square-shaped open regions 415, the first and second arms 502/512 and 504/514 of the cross-shaped sensors 402/412 are tapered at the ends to form right angles (denoted in FIGS. 5A and 5B as angles α).

Referring again to FIG. 4, the sensor pattern 400 further includes a plurality of floating separators 420 disposed within the square-shaped open regions 415 located between the arms of adjacent cross-shaped sensors 402 and cross-shaped sensors 412. The floating separators 420 may be included in any of the patterned material layers. The floating separators 420 are conductive portions that are not electrically connected to each other, to cross-shaped sensors 402, to cross-shaped sensors 412, or to any other structure of the sensor pattern 400.

In some embodiments, the floating separators 420 are each comprised of the same material as the cross-shaped sensors 402 and 412 and as the connecting members 404 and 414. In a preferred embodiment, the cross-shaped sensors 402 and 412, connecting members 404 and 414, and floating separators 420 are comprised of ITO. Thus, the inclusion of floating separators 420 provide for a consistent visual effect to a user.

It should be appreciated, however, that the arrangement of floating separators 420 is merely exemplary of one way to arrange the plurality of floating separators 420 within the open regions 415. Furthermore, the use of square-shaped tiles for the plurality of floating separators 420 is exemplary. Other tile shapes, for example, round, triangular, hexagonal, rectangular, and the like, could instead be chosen. It should also be appreciated that, in some embodiments, the arms of the cross-shaped sensors may be designed such that the open regions 505 and 415 are defined as shapes other than isosceles right triangles and squares.

The structures described herein provide a number of advantages in comparison to the prior art structures of FIG. 1. For example, the reduction in the sensor surface area improves resolution of the sensors and reduces the noise captured from the LCD below the capacitive touchscreen panel. The cross-shaped design increases the perimeter of interaction between the "Xsense" and "Yforce" sensors, thereby improving the sensitivity of the touch panel by increasing the mutual coupling resulting in improved sensitivity in spite of reduced sensor surface area. Additionally, the slotted openings and floating separators aid in increasing the fringing fields, which in turn increases the sensitivity of the capacitive touchscreen panel. Thus, accuracy and sensitivity to capacitive touches and proximity detections are improved, particularly for embodiments in which an object having a small contact surface area, such as a stylus, is used to interface with the capacitive touchscreen.

The sensor pattern maintains a symmetric design and intrinsically provides better linear variation of touch object performance. Thus, the accuracy and operating linearity profile for the sensor are improved, aiding simpler linear interpolation in the signal processor as the coupling is more uniform across the channels.

The disclosed sensor pattern also provides improved anti-touch performance. The anti-touch improvement is due to the reduced size of the X-sense channel. In the proposed patterns, the area of the X-sense electrode is reduced in comparison to that of the diamond pattern, thereby reducing the parasitic return path capacitance when the system is isolated from operator grounding (earth).

It should be appreciated that the disclosed embodiments of a touchscreen sensor pattern may be incorporated in a capacitive touchscreen application. As such, the disclosed structures may be used to detect a user touch (e.g., finger or stylus) in the capacitive touchscreen application. Therefore, the capacitive touchscreen may include additional circuitry or components for detecting and/or processing a user touch, and/or for performing various functions in response to a detected user touch.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A capacitive sensing structure, comprising:
   a plurality of first electrically conductive sensor structures electrically coupled to each other in a first direction; and
   a plurality of second electrically conductive sensor structures electrically coupled to each other in a second direction; and
   wherein each of the first electrically conductive sensor structures and second electrically conductive sensor structures comprise a cross-shaped region; and
   wherein the first and second electrically conductive sensor structures cross within the captive sensing structure.

2. The capacitive sensing structure of claim 1, further comprising a plurality of single electrically conductive structures, each disposed between a pair of adjacent first and second electrically conductive sensor structures.

3. The capacitive sensing structure of claim 2, wherein the single electrically conductive structures are electrically floating with respect to the plurality of first electrically conductive sensor structures and plurality of second electrically conductive sensor structures.

4. The capacitive sensing structure of claim 2, wherein one of the single electrically conductive structures is disposed within an open region formed between the pair of adjacent first and second electrically conductive sensor structures.

5. The capacitive sensing structure of claim 2, wherein at least one of the plurality of first electrically conductive sensor structures, plurality of second electrically conductive sensor structures, and plurality of single electrically conductive structures is comprised of indium tin oxide.

6. The capacitive sensing structure of claim 1, wherein one or more of the plurality of first electrically conductive sensor structures comprise an opening along a peripheral edge of the first electrically conductive sensor structure.

7. The capacitive sensing structure of claim 1, wherein one or more of the plurality of second electrically conductive sensor structures comprise an opening along a peripheral edge of the second electrically conductive sensor structure.

8. The capacitive sensing structure of claim 1, wherein the cross-shaped region comprises a first arm extending along the first direction, and a second arm extending along the second direction and bisecting the first arm to form open regions at least partially defined by the first and second arm.

9. The capacitive sensing structure of claim 1, wherein the first and second directions are orthogonal.

10. A capacitive sensing structure, comprising:
a plurality of first electrically conductive sensor structures electrically coupled to each other in a first direction, each first electrically conductive sensor structure comprising:
a first arm extending along the first direction, and
a second arm extending along a second direction perpendicular to the first direction and bisecting the first arm to form open regions at least partially defined by the first and second arm; and
a plurality of second electrically conductive sensor structures electrically coupled to each other in the second direction, each second electrically conductive sensor structure comprising:
a third arm extending along the second direction, and
a fourth arm extending along the first direction and bisecting the third arm to form open regions at least partially defined by the third and fourth arm; and
wherein the first and second electrically conductive sensor structures cross within the capacitive sensing structure.

11. The capacitive sensing structure of claim 10, further comprising a plurality of single electrically conductive structures, each disposed within open regions located between adjacent first and second electrically conductive sensor structures.

12. The capacitive sensing structure of claim 11, wherein the single electrically conductive structures are electrically floating with respect to the plurality of first electrically conductive sensor structures and plurality of second electrically conductive sensor structures.

13. The capacitive sensing structure of claim 11, wherein the open regions located between adjacent first and second electrically conductive sensor structures comprise a square-shaped open region, and the single electrically conductive structures disposed within the square-shaped open region located between adjacent first and second electrically conductive sensor structures are square shaped.

14. The capacitive sensing structure of claim 11, wherein at least one of the plurality of first electrically conductive sensor structures, plurality of second electrically conductive sensor structures, and plurality of single electrically conductive structures is comprised of indium tin oxide.

15. The capacitive sensing structure of claim 10, wherein one or more of the plurality of first electrically conductive sensor structures comprise an opening along a peripheral edge of the first electrically conductive sensor structure.

16. The capacitive sensing structure of claim 10, wherein one or more of the plurality of second electrically conductive sensor structures comprise an opening along a peripheral edge of the second electrically conductive sensor structure.

17. A capacitive sensing structure, comprising:
a plurality of transmit electrodes electrically coupled to each other in a first direction, each transmit electrode comprising:
a first arm extending along the first direction, and
a second arm extending along a second direction perpendicular to the first direction and bisecting the first arm to form open regions at least partially defined by the first and second arm; and
a plurality of receive electrodes electrically coupled to each other in the second direction, each receive electrode comprising:
a first arm extending along the second direction, and
a second arm extending along the first direction and bisecting the first arm to form open regions at least partially defined by the first and second arm; and
wherein the transmit and receive electrodes cross within the capacitive sensing structure.

18. The capacitive sensing structure of claim 17, further comprising a plurality of single electrically conductive structures, each disposed within open regions of adjacent transmit and receive electrodes.

19. The capacitive sensing structure of claim 18, wherein the single electrically conductive structures are electrically floating with respect to the plurality of transmit electrodes and plurality of receive electrodes.

20. The capacitive sensing structure of claim 18, wherein the open regions of adjacent transmit and receive electrodes comprise a square-shaped open region, and the single electrically conductive structures disposed within the square-shaped open region formed between adjacent transmit and receive electrodes are square shaped.

21. The capacitive sensing structure of claim 18, wherein at least one of the plurality of transmit electrodes, plurality of receive electrodes, and plurality of single electrically conductive structures is comprised of indium tin oxide.

22. The capacitive sensing structure of claim 17, wherein one or more of the plurality of transmit electrodes comprises an opening along a peripheral edge of at least one of the first arm and second arm of the transmit electrode.

23. The capacitive sensing structure of claim 17, wherein one or more of the plurality of receive electrodes comprises an opening along a peripheral edge of at least one of the first arm and second arm of the receive electrode.

* * * * *